Aug. 16, 1949.                  D. H. ANNIN                    2,479,454
                         FLUID FLOW CONTROL APPARATUS
Filed Jan. 18, 1945                                          2 Sheets-Sheet 1
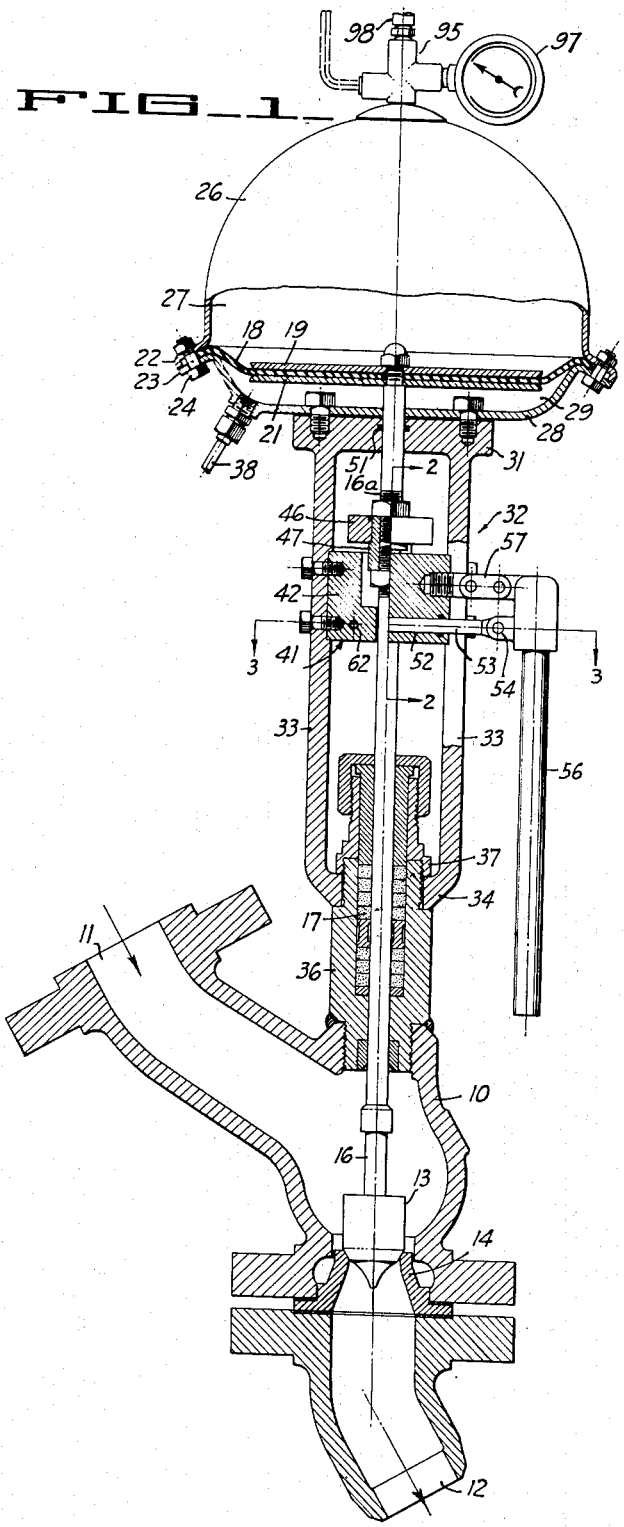
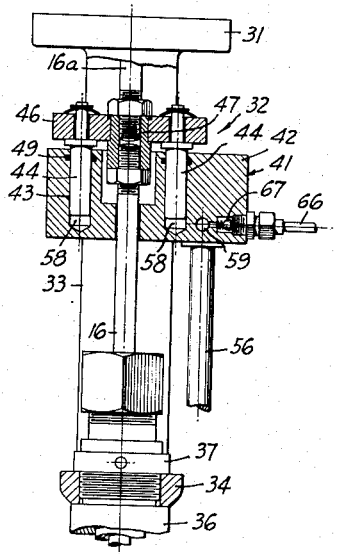
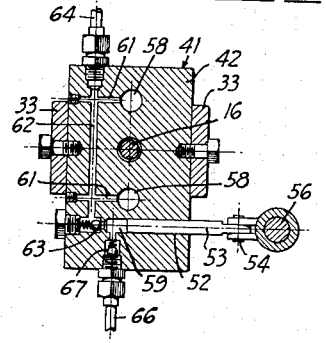
INVENTOR.
BY  D. H. Annin
    Paul D. Flehr
             ATTORNEY Aug. 16, 1949.   D. H. ANNIN   2,479,454
FLUID FLOW CONTROL APPARATUS
Filed Jan. 18, 1945   2 Sheets-Sheet 2
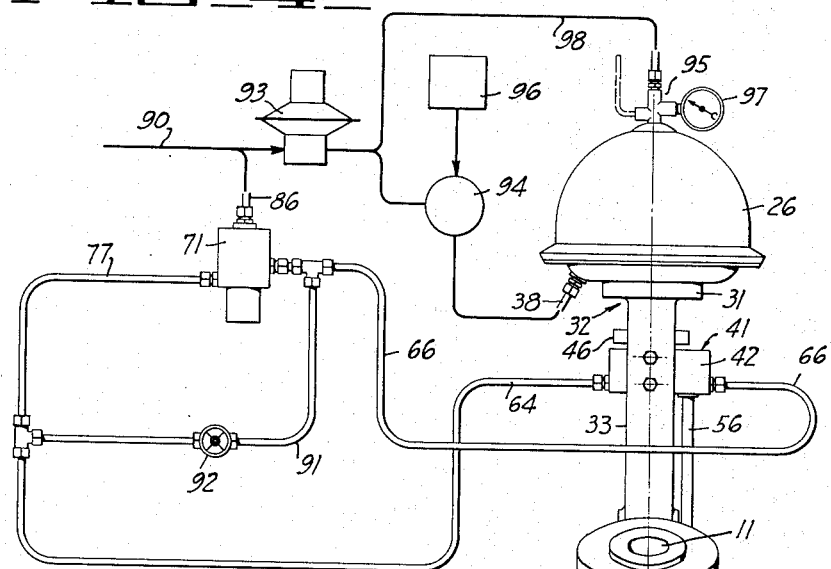
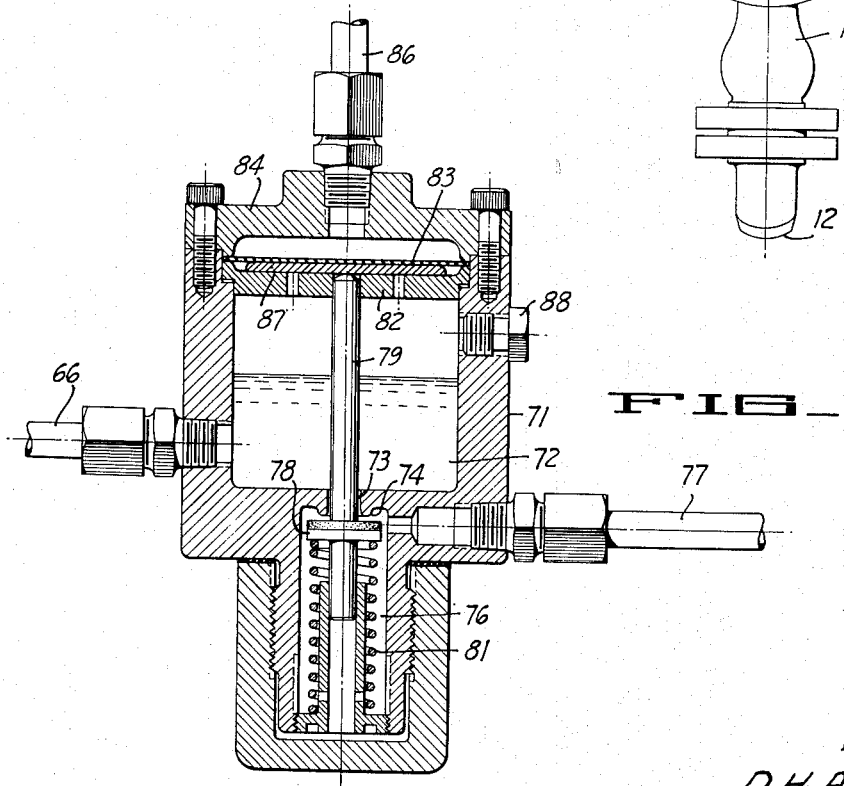
INVENTOR.
D. H. Annin
ATTORNEY Patented Aug. 16, 1949

2,479,454

UNITED STATES PATENT OFFICE 2,479,454

FLUID FLOW CONTROL APPARATUS

Douglas H. Annin, Oakland, Calif., assignor, by mesne assignments, to Fluid Control Engineering Co., Emeryville, Calif., a co-partnership consisting of M. H. Grove and J. E. Grove Application January 18, 1945, Serial No. 573,379

3 Claims. (Cl. 137—139)

This invention relates generally to fluid flow control or valve apparatus of the type having remote controlled motive means connected to its valve operating member.

In many industrial applications it is common to utilize so-called "motor valves" for the automatic or remote control of fluid flow. A typical motor valve consists of a valve body having inflow and outflow passages connected to piping, and having its valve member connected to the inner end of a reciprocating valve rod. The outer end of this rod connects to a diaphragm or piston which is operated by air pressure to position the valve as desired. It is conventional to have the fluid pressure urge the valve member in one direction only, with the loading force of a spring being applied to urge the valve toward one limiting position, as for example closed position. The controlling air pressure can be supplied by a suitable remote control instrument, which in turn may be either manually controlled or automatically controlled responsive to values such as temperature, pressure, etc. In some instances the instrument operates through a so-called valve positioner.

Conventional motor valves as described above have certain inherent disadvantages. For example when there is a failure of air supply for the controlling pressure, the loading spring immediately moves the valve member to a limiting position, as for example full closed position. This may seriously interfere with continuation of the industrial process with which the valve is being used. In addition after such air supply failure, it is difficult to operate the valve manually to force the rod member toward a desired operating position. The common type of hand wheel and threaded rod mechanism used for this purpose is cumbersome and expensive, and is difficult to operate against a heavy loading spring.

It is an object of the present invention to provide improved flow control apparatus of the above type having means whereby when there is a failure of the air supply the valve member is locked in the position which it occupied at that time.

A further object of the invention is to provide a motor valve having improved and simplified means for manually moving the valve member after there has been a failure of the air supply.

Another object of the invention is to provide an improved motor valve which eliminates use of heavy loading springs.

Further objects of the invention will appear from the following description in which the preferred embodiment has been shown in detail in conjunction with the accompanying drawing.

Referring to the drawing:

Fig. 1 is a side elevational view partly in cross section showing fluid flow control apparatus incorporating the present invention.

Fig. 2 is a cross sectional detail showing details of the hydraulic means utilized in conjunction with Fig. 1.

Fig. 3 is a cross sectional detail taken along the line 3—3 of Fig. 1.

Fig. 4 is a diagrammatic view showing supplemental equipment which can be used with the apparatus of Fig. 1.

Fig. 5 is a side elevational view in cross section showing means utilized with the apparatus of Fig. 1 for effecting a hydraulic lock in event of failure of the air supply.

The apparatus illustrated in the drawing consists generally of a valve body 10 having fluid passages 11 and 12, adapted to be connected with associated piping to form inlet and outlet passages. Within the body there is valve member 13 cooperating with the stationary seat 14. Valve member 13 is attached to the inner end of a valve operating rod 16, which extends to the exterior of the body through the packing gland 17.

The motive means connected to the operating rod 16 includes the flexible diaphragm 18, which is assembled with the upper and lower diaphragm plates 19 and 21, and is attached to the outer end of rod 16.

The mounting means for the diaphragm 18 includes the flanges 22 and 23, which are clamped together by means such as bolts 24 to engage and seal upon the peripheral edge portion of the diaphragm. Flange 22 is formed on the dome 26, which provides a closed chamber 27 on the upper side of the diaphragm. Flange 23 is formed on the dished plate 28 which forms a chamber 29 on the lower side of the diaphragm. For convenience in manufacture and assembly plate 28 is shown mounted upon the end portion 31 of the yoke 32. The two spaced parallel struts 33 of this yoke have their ends adjacent the valve body attached to a mounting ring 34, which fits upon the end of the body extension 36, and is retained in place by suitable means such as nut 37.

In utilizing the assembly described above sufficient gas pressure is maintained in chamber 27 to provide the desired loading forces upon the diaphragm, to thereby continuously urge the valve member toward closed position. Controlling gas or air under pressure is supplied to the lower chamber 29, as through the pipe 38. The valve is thereby caused to take a position depending upon the pressure of gas applied in the chamber 29. As will be presently explained the source of this varying gas pressure may vary in different instances.

In conjunction with the valve rod 16 a mechanism is provided designated generally at 41, which is capable of locking the valve rod in any operating position against the loading force of gas in chamber 27. Briefly this mechanism consists of a body 42 provided with cylindrical bores 43. Plunger-like pistons 44 are fitted within the bores 43, and are attached to the cross head 46. Body 42 is attached to the stationary struts 33, while the cross head 46 is operatively connected to the rod 16. Thus the upper end of rod 16 has a threaded connection with sleeve 47, which in turn is seated within the cross head 46. A rod 16a, which is in alignment with rod 16, likewise has a threaded connection with sleeve 47 and a direct connection with the center of the diaphragm 18. Suitable packing 49 is provided about plungers 44 to prevent leakage. This packing may be synthetic rubber rings of the O type, carried within suitable annular grooves formed in the body 42. A similar seal 51 can be provided about rod 16a.

In order to provide manual operating means, body 42 is provided with a cylinder bore 52 which receives the plunger 53. The outer end of this plunger is pivotally connected at 54 to the operating lever 56. One end of this lever pivotally connects through links 57 to the body 42. Thus by oscillating lever 56 plunger 53 can be reciprocated.

Spaces 58 at the inner ends of bores 43, and space 59 at the inner end of bore 52, connects with fluid ducts as shown in Figure 3. Thus duct 61 leads from spaces 58 to the cross connecting duct 62. Duct 62 also connects with space 59, through the small ball check valve 63. A pipe 64 makes connection with duct 62, thus is continuously in communication with spaces 58. A pipe 66 makes connection with space 59 through the ball check 67. It is evident that if liquid contained in spaces 58, 59 and the ducts described, is permitted to surge through pipe 64, plungers 44 are free to move in and out in conjunction with movements of the valve rod 16. Upon interrupting flow through pipe 64, plungers 44 and valve rod 16 are locked against movement. If at this time the pipe 66 is in communication with a source of oil and handle 56 is oscillated, oil is pumped through the check valves 63 and 67 into the spaces 58 to move the plungers 44 and thus move the valve member toward open position.

Opening and closing of flow through pipe 64 is preferably carried out automatically in response to a failure of the air supply. A suitable pneumatically operated valve assembly for this purpose is shown in Figure 5. It consists of a body 71 forming an oil reservoir 72 which is normally connected with the pipe 66. At the lower end of the reservoir there is an orifice 73 leading through the valve seat 74 and to the space 76 below the seat. This space connects with the pipe 77. A simple valve member 78, carried by operating stem 79, is arranged to engage seat 74. Compression spring 81 urges the valve member toward closed position. The upper end of valve stem 79 extends through a plate 82 which is mounted in the upper end of the body 71. Above plate 82 there is a flexible diaphragm 83, and the space above this diaphragm is closed by plate 84. A pipe 86 connects through plate 84, and pressures applied to this pipe act upon the diaphragm. A diaphragm plate 87 extends across the lower side of diaphragm 83, and abuts the upper end of the stem 79. The space above the oil in reservoir 72 connects with the atmosphere through the orifice fitting 88.

Figure 4 serves to diagrammatically illustrate the connection between the device of Figure 5, and the mechanism 41. To facilitate manual control the two pipes 64 and 66 are preferably interconnected by pipe 91, which can be opened or closed by the small valve 92. Normally this needle valve is closed. Air supply pipe 90 is shown connected to the pressure reducing regulator 93, which has its outlet connected to a valve positioner 94, such as shown for example in Patent No. 2,312,301. The positioner has a mechanical connection to the valve rod, and pneumatic connections with pipe 38 and the controlling instrument 96.

Operation of the apparatus described above can be explained as follows: It is presumed that a pressure is maintained in chamber 27 above the diaphragm sufficient to provide loading forces of the necessary magnitude to continuously urge the valve member toward closed position. In other words for the minimum normal pressure applied to chamber 29, the gas pressure in chamber 27 should be sufficient to urge the valve member to closed position whereby increased pressures can be applied to chamber 27, to move the valve member to various operating positions intermediate closed and full open positions. In some instances passage 11 may be the inflow passage, and therefore line pressure tends to urge the valve member toward closed position. However in other installations passage 12 may be made the inflow passage, in which event line pressure tends to urge the valve member toward open position. The gas pressure in chamber 27 may be a fixed amount, introduced by way of fitting 95, and as indicated by pressure gauge 97. In other instances chamber 27 may be continuously connected by pipe 98 to a source of gas under pressure such as the outlet of regulator 93.

As explained above for normal operation of the motor valve between full open and closed positions the pressure of gas in chamber 27 varies between maximum and minimum values. In certain instances however there may be a total failure of air pressure from pipe 90 in which event the control for the motor valve is made inoperative. Without the mechanism 41 it is apparent that upon the occurrence of such an abnormal condition, the loading forces exerted by the pressure in gas chamber 27 would immediately force the valve member to full closed position. It would then be necessary to repair the damage, and if it were desired to open the valve while correcting the difficulty, it would be necessary to jack the valve toward open position by manual means. With the present apparatus when a failure of air supply occurs, valve member 78 of the device shown in Figure 5 immediately closes. Closing of valve 78 immediately prevents flow of liquid through pipe 77, with the result that the plungers 44 and also valve stem 16 are locked against movement toward the valve body. Thus the main valve member is retained in the same position which it occupied when the air failure occurred. Now if an operator wishes to jack the valve member toward full open position, from the position in which it is locked, it is only necessary to operate the jacking lever 56, which as previously explained pumps liquid beneath the plungers 44, thus raising these plungers together with the operating rod 18. If it is desired to cause movement of the valve member toward closed position, from a locked position, or from a position in which it has been jacked by motion of lever 56, then the valve 92 is opened thus permitting a by-passing of liquid from pipe 64 back to the reservoir 72, with the result that the plungers 44 are free to move together with the valve rod 16 toward the valve body.

It will be evident from the foregoing that the present invention provides a safety lock for the valve which is less apt to interfere with continued operation of other equipment with which the apparatus is used. In other words a complete automatic shut-off of the main valve in the event of failure of air supply is prevented, and at the same time immediately after a failure of air supply the valve can be readily operated manually to a desired operating position.

I claim:

1. In fluid flow control apparatus, a valve body having inflow and outflow passages, a valve seat formed within the body, a valve member cooperating with the seat and movable in opposite directions between open and closed limiting positions, a valve rod secured to the valve member, a flexible diaphragm connected to the valve rod and serving to move the same, means forming a closed chamber upon one side of the diaphragm adapted to receive gas under pressure to provide loading forces upon the diaphragm and the valve rod to continuously urge the valve rod toward one of said limiting positions, means forming a second closed gas chamber upon the other side of the diaphragm, means for applying varying gas pressures to said last named chamber for flexing the diaphragm against said loading forces to position the valve rod and said valve member in various operating positions, a hydraulic operator connected to the valve rod, means serving to lock said operator responsive to failure of gas supply for said last named chamber, and manual means for operating said hydraulic operator to move the valve rod against said loading forces, following such failure.

2. In fluid flow control apparatus, a valve body having inflow and outflow passages, a valve seat formed within the body, a valve member cooperating with the seat and movable in opposite directions between open and closed limiting positions, a valve rod secured to the valve member, a flexible diaphragm connected to the valve rod and serving to move the same, means forming a closed chamber upon one side of the diaphragm adapted to receive gas under pressure to provide loading forces upon the diaphragm and the valve rod to continuously urge the valve rod towards one of said limiting positions, means forming a second closed gas chamber upon the other side of the diaphragm, means for applying varying gas pressures to said last named chamber for flexing the diaphragm against said loading forces to position the valve rod and said valve member in various operating positions, additional operating means connected to said valve rod, means serving to lock said valve rod and said additional operating means responsive to failure of gas supply for said last named chamber, and manual means for operating said additional means to move the valve rod against said loading forces, following such failure.

3. In fluid flow control apparatus, a valve body having inflow and outflow passages, a valve seat formed within the body, a valve member cooperating with the seat and movable in opposite directions between open and closed limiting positions, a valve rod secured to the valve member, a flexible diaphragm connected to the valve rod and serving to move the same, means forming a closed chamber upon one side of the diaphragm adapted to receive gas under pressure to provide loading forces upon the diaphragm and the valve rod to continuously urge the valve rod towards one of said limiting positions, means forming a second closed gas chamber upon the other side of the diaphragm, means for applying varying gas pressures to said last named chamber for flexing the diaphragm against said loading forces to position the valve rod and said valve member in various operating positions, hydraulic means associated with said valve rod, said means comprising a cylinder block surrounding the valve rod and attached to the body, a piston or plunger slidably fitted within the cylinder bore of said block and attached to the valve rod, and means serving to automatically lock said hydraulic means to retain the valve rod against further movement responsive to failure of gas supply for said varying air pressures.

DOUGLAS H. ANNIN.

REFERENCES CITED

The following references are of record in the file of this patent:

UNITED STATES PATENTS

| Number | Name | Date |
|---|---|---|
| 2,082,325 | Cross | June 1, 1937 |
| 2,177,825 | Grove | Oct. 31, 1939 |
| 2,339,469 | Emanuel | Jan. 18, 1944 |